(12) United States Patent
Benazzi et al.

(10) Patent No.: US 10,655,596 B2
(45) Date of Patent: May 19, 2020

(54) WIND POWER SYSTEM

(71) Applicant: GAIA S.R.L., Bologna (IT)

(72) Inventors: Riccardo Benazzi, Jolanda di Savoia (IT); Davide Pelizzari, Ferrara (IT)

(73) Assignee: GAIA S.R.L., Bologna (IT)

( * ) Notice: Subject to any disclaimer, the term of this patent is extended or adjusted under 35 U.S.C. 154(b) by 141 days.

(21) Appl. No.: 15/555,890

(22) PCT Filed: Mar. 5, 2015

(86) PCT No.: PCT/IT2015/000058
§ 371 (c)(1),
(2) Date: Sep. 5, 2017

(87) PCT Pub. No.: WO2016/139685
PCT Pub. Date: Sep. 9, 2016

(65) Prior Publication Data
US 2018/0051669 A1    Feb. 22, 2018

(51) Int. Cl.
*F03D 1/02* (2006.01)
*F03D 7/02* (2006.01)

(52) U.S. Cl.
CPC ............. *F03D 1/02* (2013.01); *F03D 7/0204* (2013.01); *F05B 2240/14* (2013.01);
(Continued)

(58) Field of Classification Search
CPC ............. F05B 2240/14; F05B 2240/40; F05B 2240/917; Y02E 10/721; Y02E 10/723; Y02E 10/728; F03D 1/02; F03D 7/0204
(Continued)

(56) References Cited

U.S. PATENT DOCUMENTS 4,140,433 A * 2/1979 Eckel .................. F03D 1/04
                                                                  415/209.1
4,316,699 A * 2/1982 Schott .................. F03D 7/0224
                                                                  416/139
(Continued)

FOREIGN PATENT DOCUMENTS

CN    201621008 U    11/2010
CN    102080622 A    6/2011
(Continued)

OTHER PUBLICATIONS

International Search Report dated Jan. 10, 2015 re: Application No. PCT/IT2015/000058; pp. 1-4; citing: US 2014/301824 A1, WO 2012/068536 A1, US 2008/093861 A1, WO 2013/124788 A1 and WO 2013/028172 A1.
(Continued)

*Primary Examiner* — Charles Reid, Jr.
(74) *Attorney, Agent, or Firm* — Cantor Colburn LLP

(57) ABSTRACT

A wind power system, having at least one rotor, which controls a respective driven utility apparatus, and at least one stator. The rotor includes vanes arranged radially, which have a substantially flat profile. The vanes are inclined with respect to the rotation axis of the rotor through an angle between 25° -90°. The system further includes at least one stator arranged upstream of the rotor and is provided with a tubular body coaxial to both the shaft of the rotor and a substantially cylindrical outer enclosure. The tubular body includes a tapered end and curved blades profiled to direct the air entering the system toward the outerportion of the rotor onto the vanes. Between the inner walls of the enclosure, two adjacent blades, and tubular body, there is a forced path for the air entering the system.

8 Claims, 2 Drawing Sheets

(52) U.S. Cl.
CPC ..... *F05B 2240/40* (2013.01); *F05B 2240/917* (2013.01); *Y02E 10/721* (2013.01); *Y02E 10/723* (2013.01); *Y02E 10/728* (2013.01)

(58) Field of Classification Search
USPC ..................................................... 290/55, 44
See application file for complete search history.

(56) References Cited

U.S. PATENT DOCUMENTS

| | | | | |
|---|---|---|---|---|
| 4,403,916 | A * | 9/1983 | Skelskey | F03D 7/0212 416/14 |
| 8,257,018 | B2 * | 9/2012 | Coffey | F03D 3/005 290/44 |
| 8,668,433 | B2 | 3/2014 | Friesth et al. | |
| 2005/0182390 | A1 | 8/2005 | Shanley | |
| 2007/0013196 | A1 | 1/2007 | Chen | |
| 2008/0093861 | A1 | 4/2008 | Friesth et al. | |
| 2008/0124216 | A1 * | 5/2008 | Liao | F03D 1/0675 416/24 |
| 2009/0072543 | A1 | 3/2009 | Yeh | |
| 2009/0146435 | A1 * | 6/2009 | Freda | F03D 9/11 290/55 |
| 2010/0060012 | A1 * | 3/2010 | Reitz | F03D 1/04 290/55 |
| 2010/0233919 | A1 * | 9/2010 | Ersoy | B63H 9/02 440/8 |
| 2010/0296928 | A1 * | 11/2010 | Falcone | E04C 2/20 416/120 |
| 2010/0314886 | A1 * | 12/2010 | Potter | F03D 1/04 290/55 |
| 2011/0042958 | A1 * | 2/2011 | Vander Straeten | F03D 3/064 290/55 |
| 2011/0133470 | A1 * | 6/2011 | Winn | F03D 15/00 290/55 |
| 2012/0051939 | A1 * | 3/2012 | Marvin | F03D 1/04 416/244 R |
| 2012/0301293 | A1 * | 11/2012 | Bech | F03D 80/00 416/1 |
| 2014/0125058 | A1 * | 5/2014 | Olesen | G01P 5/20 290/44 |
| 2014/0301824 | A1 | 10/2014 | Yu | |
| 2017/0370386 | A1 * | 12/2017 | Wardropper | F03D 80/00 |

FOREIGN PATENT DOCUMENTS

| | | |
|---|---|---|
| JP | 5940585 U | 3/1984 |
| JP | 2001295750 A | 10/2001 |
| JP | 2006214302 A | 8/2006 |
| JP | 2008528846 A | 7/2008 |
| JP | 2009503337 A | 1/2009 |
| JP | 2010053805 A | 3/2010 |
| JP | 2012527577 A | 11/2012 |
| WO | 2012068536 A1 | 5/2012 |
| WO | 2013028172 A1 | 2/2013 |
| WO | 2013124788 A1 | 8/2013 |

OTHER PUBLICATIONS

Written Opinion dated Jan. 10, 2015 re: Application No. PCT/IT2015/000058; pp. 1-5; citing: US 2014/301824 A1, WO 2012/068536 A1, US 2008/093861 A1, WO 2013/124788 A1 and WO 2013/028172 A1.

JP Office Action dated Feb. 5, 2019 re: Application No. 2017-544673, pp. 1-6, citing: JP 59-40585, US 2014/0301824 A1, JP 2012-527577 A.

JP Office Action dated Oct. 29, 2019 re: Application No. 2017-544673, pp. 1-4, citing: JP 57-132490 (JP59-40585 U), US 2014/0301824 A1, JP 2012-527577 A, JP 2008-528846 A, JP 2010-53805 A, JP 49-050242 (JP 50-139211 U), JP 2006-214302 A, JP 56-41466 A, JP 22001-295750 A, JP 2009-503337 A, JP 49-156176 (JP51-81843 U), US 2007/0013196 A1 and US 2009/0072543 A1.

\* cited by examiner

WIND POWER SYSTEM

TECHNICAL FIELD

The present disclosure relates to a wind power system for the production of electricity.

BACKGROUND

In recent years the wind power sector has seen a huge expansion owing to the fact that wind energy is a credible alternative to fossil fuels, since it is renewable, available everywhere, and clean; however, conventional wind power assemblies (by which is principally meant the now-classic wind towers with three vanes, which, in industrial terms, effectively monopolize the worldwide scene) present problems of a physical and economic nature which make wind power an inferior energy source or at any rate a parallel one, and in any case not yet a replacement for energy from hydrocarbons.

Every wind power system has, in fact, firstly, the undeniable need to have the broadest possible area for capturing wind, in order to collect the maximum quantity of kinetic energy and have a suitable production; it is further necessary to raise the system as high as possible from the ground so as to intercept wind that is more powerful and dependable. Current wind towers are therefore provided, to this end, with supporting masts of ever-increasing height and diameter, in order to withstand the increased torsional forces, and with vanes of increasing length in order to increase as much as possible the diameter of the single rotor, and thus the wind capture area; unfortunately, however, as the diameter of a rotor increases there is, for the same wind, a proportional decrease in its specific yield, and a proportional increase in the windspeed necessary in order to trigger the rotation. Furthermore, the necessity of making, transporting and raising increasingly big structures has meant an exponential increase of the installation costs. It is also important to add that the vanes of current wind towers are provided with a very sophisticated wing profile that is not only extremely expensive, but also owes its high performance levels to an effect called "lift" that is generated only in the presence of sustained winds. The set of problems mentioned above makes the installation of current wind power systems profitable, and hence possible, only in areas with high average winds and then only if there are significant economic incentives.

SUMMARY

The aim of the present disclosure is to solve the above mentioned drawbacks, by providing a wind power system that offers high yields.

Within this aim, the disclosure provides a wind power system that can operate with reduced windspeeds.

The present disclosure also provides a wind power system that can also be installed in areas with low levels of wind.

The present disclosure further provides a wind power system that is easy and economic to make, transport, install and maintain.

The present disclosure also provides a wind power system that has reduced periods of inactivity.

The present disclosure further provides a wind power system that is agri-compatible.

The present disclosure provides a wind power system which is low cost, easily and practically implemented and safe in use.

This aim and these and other advantages are achieved by providing a wind power system, comprising at least one rotor, which controls at least one respective driven utility apparatus, and at least one stator, characterized in that said at least one rotor is provided with a plurality of vanes that have a substantially flat profile, are arranged radially, and are inclined with respect to the rotation axis of the rotor by an angle comprised between 25° and 90°, said stator, which is arranged upstream of said at least one rotor, being provided with a tubular body, which is coaxial to the shaft of said rotor and coaxial to a substantially cylindrical outer enclosure, said tubular body being provided with a tapered end fairing and with respective curved blades that are profiled to direct the air entering said stator toward the outer portion of said rotor onto said vanes, according to a preset angle of incidence that is adapted to maximize the yield of the wind power system, between the inner walls of said enclosure, two adjacent blades and said tubular body there being a forced path for the air entering said system.

BRIEF DESCRIPTION OF DRAWINGS

Further characteristics and advantages of the disclosure will become better apparent from the description of a preferred, but not exclusive, embodiment of the wind power system according to the disclosure, which is illustrated by way of non-limiting example in the accompanying drawings wherein.

DETAILED DESCRIPTION OF DRAWINGS

Figure 1:
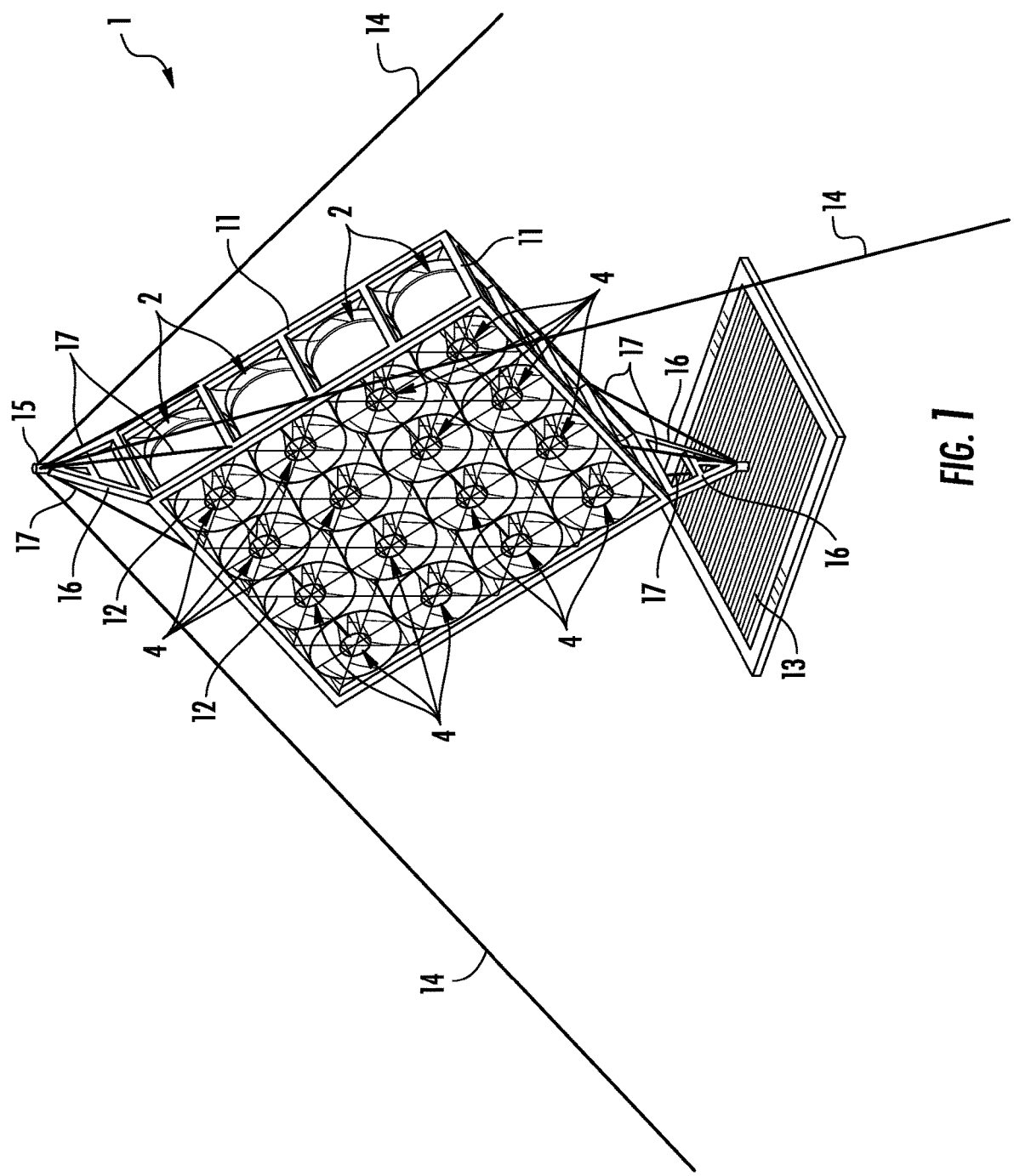
FIG. 1 is a perspective view of the wind power system, according to the disclosure.
Figure 2:
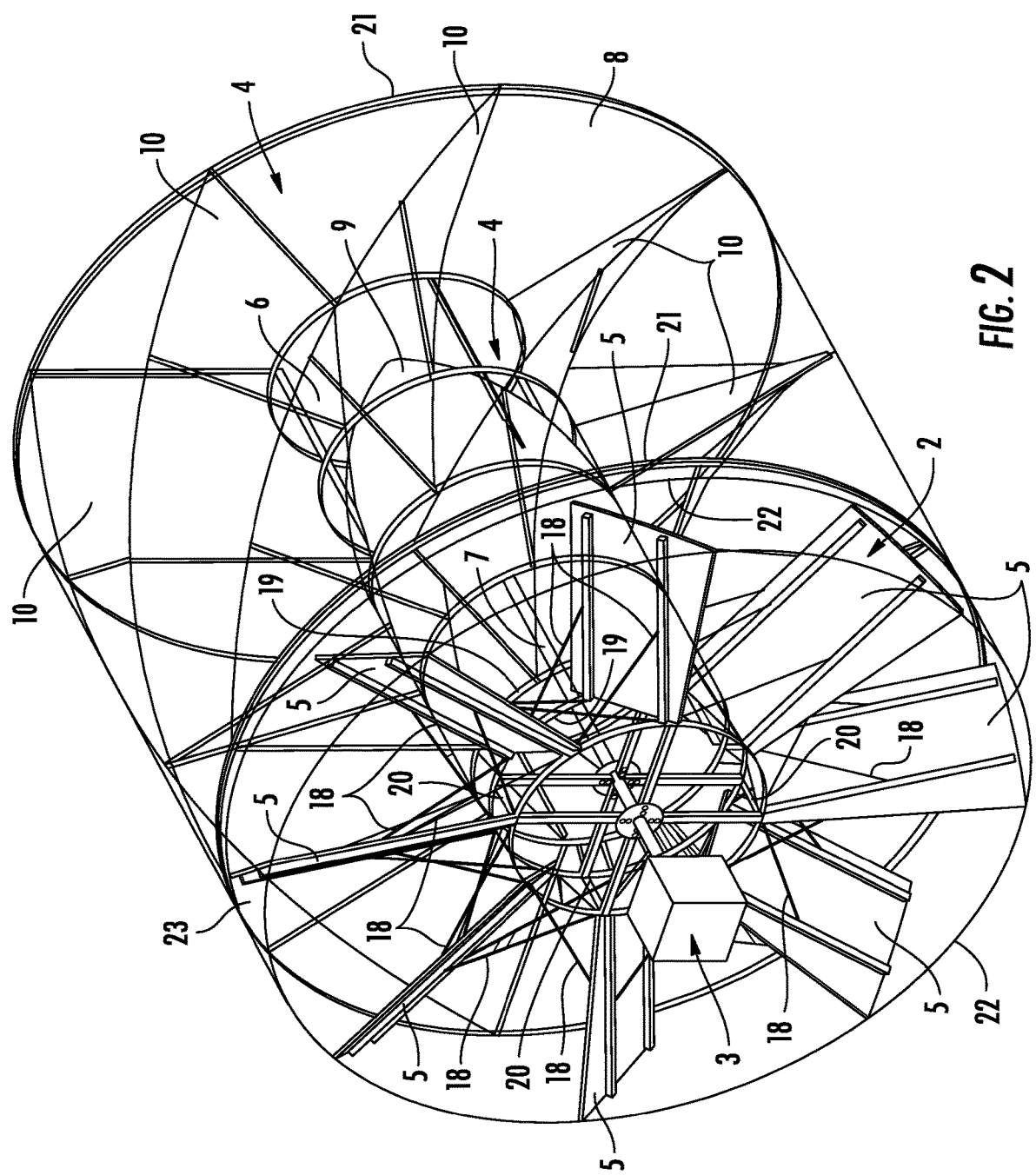
FIG. 2 is a perspective view of some components of the wind power system, according to the disclosure.

With particular reference to the figures, the reference numeral 1 generally designates the wind power system, which comprises at least one rotor 2, which controls at least one respective driven utility apparatus 3, and at least one stator 4.

According to the disclosure, the at least one rotor 2 is provided with a plurality of vanes 5, which are arranged radially and have a substantially flat profile.

It should be noted that the wing profile of conventional vanes, although technologically very sophisticated and offering high energy yields, comes with production costs that are rather high.

The necessity of lowering such costs has resulted in the choice to abandon the wing profile, which was adopted for conventional vanes.

In fact, the vanes 5, with a flat profile, because they are easier to make, enable considerable reduction in costs.

Furthermore, when using vanes with a wing profile, in order to generate the lift that makes it possible to obtain such yields, it is necessary to have wind that is strong and dependable.

On the contrary, the flat profile of the vanes 5, since it does not have to generate the lift effect, triggers the rotation, and thus the production of energy, with winds at much lower speeds than that necessary to actuate vanes with a conventional wing profile.

More specifically, the vanes 5 are inclined with respect to the rotation axis of the rotor 2 through an angle that is comprised between 25° and 90°.

Furthermore, the system 1 comprises at least one stator 4, which is arranged upstream of the at least one rotor 2 and is provided with a tubular body 6 that is coaxial to the shaft 7 of the rotor 2 and coaxial to a substantially cylindrical outer enclosure 8.

The shaft 7 supports the rotor 2 and keeps it in the active position, passing through it in its central part and being rendered integral with it by way of a through pin, so as to transmit the mechanical energy, taken from the atmosphere by the rotor 2 proper, to the driven utility apparatus 3 that is connected thereto.

In particular, the tubular body 6 is provided with a tapered end fairing 9 and with respective curved blades 10 that are profiled to direct the air entering the system 1 toward the outer portion of the rotor 2 onto the vanes 5, according to a preset angle of incidence that is adapted to maximize the yield of the wind power system 1.

In fact, between the inner walls of the enclosure 8, two adjacent blades 10 and the tubular body 6 there is a forced path for the air entering the system 1.

In fact, the outer enclosure 8 is substantially in contact with the upper part of the blades 10.

The simultaneous presence of the rotor 2, of the stator 4 and of the enclosure 8 therefore enables an increase of the specific yield of the system 1.

The presence of the stator 4 makes it possible to compensate the lower performance of the flat profile of the vanes 5.

The separate use of these elements would in fact be substantially ineffective.

In fact, the presence of the stator 4 makes it possible to: deviate the wind entering the system 1 from the central region, which is less productive in energy terms, to the peripheral region, where its impact will be more effective, since it can take advantage of a greater leverage; make the speed of impact of the wind on the vane 5 uneven, slowing it in its central portion in order to accelerate it in the outer, and more productive, region; increase the angle of incidence of the wind on the vanes 5, which in conventional wind power assemblies does not exceed 45°.

In conventional assemblies, the wind direction has to be kept perpendicular to the rotor (not to the vanes), which in fact is continuously repositioned to this end, because any other angle would mean a reduction of the wind collection area, but especially the loss of uniformity in the angle of incidence on the vanes, which would in fact make the system rather unproductive.

The multi-rotor structure further makes it possible to reconcile the necessity of having a system of large dimensions with that of having rotors of small dimensions, which for this reason are capable of high performance levels; in fact in the multi-rotor system the large dimensions, which as mentioned above are indispensable, are not achieved by increasing the diameter of the single rotor, thus leading to a fall in performance, but rather by collecting together a plurality of rotors of small dimensions, which thus are characterized by high performance levels.

It should be noted that the system 1 can comprise a perimetric tubular structure 11 provided with respective cables 12, within which the rotors 2, the stators 4 and the driven utility apparatuses 3 are kept in suspension.

The presence of the cables 12 therefore makes it possible to further stiffen the tubular structure 11.

The tubular structure 11 can be cubic.

If the structure 11 is cubic, the cables 12 can connect the corners of the structure 11 along the diagonals of the sides of the cube.

The tubular structure 11 can be made of material preferably selected from among galvanized iron, steel, aluminum and the like.

These contrivances make it possible to provide a structure 11 that is light and has high resistance to the torsional forces induced by the wind.

The structure 11 can, further, be connected to a base 13 by way of respective movement elements for the rotation thereof, about its own axis, in the configuration for use and the stalled configuration, or if it is necessary to stop the system 1.

In the configuration for use the structure 11 will be positioned in a direction that is substantially perpendicular to the wind direction.

Upon reaching a windspeed that is too high, it will be possible to rotate the entire structure 11, about its own axis, by way of the respective movement elements, positioning it parallel to the wind direction, and effectively blocking the rotation of the vanes 5 of the rotor 2 as well.

The system 1 can comprise a plurality of stays 14 that connect the top 15 of the structure 11 to the ground where the system 1 is installed, in order to stabilize the entire system 1 and at the same time permit the rotation thereof about its own axis.

The fact of having a structure that is made stable, not only at the base, as occurs at present, but also at its summit, is essential in order to reconcile maximum resistance to torsional forces, induced by the wind, with maximum reduction of the weight of the structure and thus with the consequent minimization of costs of production, transport and installation.

In particular, each one of the four corners of the tubular structure 11 can be coupled to a respective triangle, which is constituted by tubes 16 joined together, the apexes of these triangles being connected, by way of further stays 17, to the tubular structure 11, so as to counterbalance, with an outward traction, the torsional forces induced by the wind and by the weight of the rotors 2 and of the stators 4.

Furthermore, the presence of the stays 17 makes it possible to increase the rigidity of the tubular structure 11.

According to a solution of particular utility, the rotors 2 and the respective stators 4 can be at least eight in number, four rotors 2 and four stators 4, mutually aligned and arranged on at least two rows each of which comprises at least two rotors 2 and two stators 4, so as to define a rhomboid tubular structure 11.

By increasing the number of rotors 2, without modifying the dimensions thereof, it is thus possible to increase the yield of the entire system 1.

The system 1 is therefore provided with a tubular structure 11, where each one of the configurations presented, i.e. the basic one that comprises four rotors 2, but also multiples of this, i.e. with sixteen or sixty-four rotors 2 etc., is capable of offering sufficient resistance to the torsional forces of the wind and an adequate support for the increase of the overall weight of the system 1.

The system 1 can thus be easily installed thanks to its easy flexibility and modularity.

It should be noted that the system 1 will be assembled on the ground in order to then be raised.

Assembly begins by putting together a first row of rotors 2 and stators 4 which will then be raised in order to insert below it a second row of rotors 2 and stators 4, and one proceeds thus until the assembly of the entire system 1 is complete.

Once the entire structure 11 is assembled, each one of the four corners thereof is coupled to the triangle, which is constituted by the assembly of tubes 16, by connecting the apex thereof by way of further stays 17, to the tubular structure 11.

Subsequently, the entire tubular structure 11 will be connected to the base 13 and hoisted up until it reaches the established position, in which it will be held by a plurality of stays 14, preferably of steel, which connect the top 15 of the system 1 to the ground.

At this point the system 1 will be operational and capable of rotating, by means of the respective movement elements, about its own axis in order to be arranged perpendicular to the wind direction.

The particular configuration of the system 1 thus makes it possible to increase the wind collection surface while keeping unaltered both the specific yield of the rotor 2 and the windspeed value required to trigger the rotation of the vanes 5 of the rotor 2.

Furthermore, the presence of the stator 4, and the particular structure of the rotor 2, make it possible to: deviate the wind from the central region, which is least productive, to the peripheral region where its impact will be more productive, as it can take advantage of a greater leverage; make the speed of impact of the wind on the length of each vane 5 uneven, slowing it in its central portion in order to accelerate it in the outer, and more productive, region; increase the angle of incidence of the wind on the vanes 5, which in conventional wind power assemblies does not exceed 45°.

In fact, the wind, initially, enters the collection area, corresponding to the area defined by the enclosure 8, and is driven, both by the redirection action of the fairing 9 and, simultaneously, by the containment action exerted by the enclosure 8, to be channeled into the space comprised between the fairing 9 and the enclosure 8.

The presence of the blades 10 thus induces a form of centrifugal force in the wind, which is opposed by the containment action of the enclosure 8.

It should furthermore be noted that the surface delimited by the inner walls of the enclosure 8, by the two adjacent blades 10 and by the tubular body 6 is substantially smaller than that of the area circumscribed by the enclosure 8 from which the wind enters the system 1, and thus the exit speed of the wind from the stator 4 is proportionally higher than the speed of entry to the system 1.

From the construction point of view, the vanes 5 can comprise a reticular structure for supporting a covering sheet.

Such reticular structure comprises a plurality of cables 18 that connect the upper end of said reticular structure to the central body of the rotor 2.

Such cables enable the vanes 5 to withstand the torsional forces induced by the wind.

Furthermore, the blades 10 can comprise at least two strengthening ribs, which are arranged substantially in series, for supporting a covering plate.

In particular, the profiled blades 10 can have a first portion that is substantially parallel to the axis of the tubular body 6, and a curved second portion, in which the profile of the blade 10 arrives at an inclination with respect to the plane of rotation of the rotor 2 which is comprised between 130° and 140° degrees.

The wind, thus, after having been localized, is inserted between the blades 10 which force it to progressively change direction by approximately 45° degrees with respect to the axis of the rotor 2.

Considering that the vanes 5 of the rotor 2 are in turn inclined, also with respect to the axis of the rotor 2, by an angle of approximately 45°, but in the opposite direction, the wind therefore will impact substantially perpendicular to and uniformly over all the vanes 5, which intuitively represents the possible configuration that makes it possible to obtain the highest productivity, in order to obtain the maximum specific yield of the system 1.

It should be noted that the fairing 9 can be placed on the same axis of the tubular body 6 of the rotor 2 and can have its same diameter, thus preventing the air flow that enters the system 1 from reaching the central part of the rotor 2 which is the least productive in energy terms, because it uses an unfavorable leverage.

The air flow will thus be concentrated, thanks in part to the containment action exerted by the outer enclosure 8, solely in the area of the vanes 5; this will generate a proportional increase of the incoming windspeed, but above all such greater thrust will be applied to only the outermost part of the rotor 2, the part occupied by the vanes 5, which is also the most productive in energy terms, because it uses a better leverage.

The central body of the rotor 2 can comprises two flanges 19 for supporting the vanes 5.

The flanges 19 can have a different and smaller diameter than the diameter of the rotor 2, and they can be arranged in series and connected by rods 20 that are arranged parallel to the shaft 7 of the rotor 2.

The dimensions of the flanges 19 can thus vary in relation to the speed of the wind present in the zone of installation of the system 1.

Furthermore, thanks to the high easiness of assembly that characterizes even the individual rotor 2, the possibility is not ruled out of mounting the flanges 19 on the vanes 5 directly at the installation location of the system 1.

The outer enclosure 8, which is substantially cylindrical, can comprise two circular crowns 21, made of a material preferably selected from among galvanized iron, steel, aluminum and the like, which are stably coupled to the tubular structure 11, for supporting a film of elastically deformable material.

In particular, the enclosure 8, in addition to defining, with its circular shape, the wind collection area, performs an indispensable containment action.

In fact, the wind is driven outwardly, not only by the action of the fairing 9, but also by the centrifugation induced by the progressive corkscrewing of the blades 10 themselves about the tubular body 6.

Thus the combined presence of the fairing 9, of the blades 10 and of the outer enclosure 8 creates, therefore, eight forced paths for the incoming air flow, which by deviating by corkscrewing about the tubular body 6, assume an angle of approximately 135° with respect to the plane of rotation of the rotor 2 and force the wind to impact simultaneously on all the vanes 5 with an angle of approximately 90° (since the vanes 5 are in turn inclined by approximately 45°, also with respect to the plane of rotation of the rotor 2).

Such angle of impact on the vanes 5 enables higher energy yields than the yields that are obtained with conventional wind power systems, where the angle with which the wind impacts on the vanes is about 45°.

In addition to the foregoing, the pressure exerted by the air flow on the outer enclosure 8 produces an increase of the speed of impact of the wind on the peripheral region of each vane 5 and a consequent fall of the speed of impact on the area of the vanes 5 nearest to the center of the rotor 2.

According to a solution of particular practicality and utility, the rotor 2 can comprise a substantially cylindrical outer covering 22 that is supported by two end rings 23, which are stably coupled to the tubular structure 11.

The covering 22 can screen the rotor 2 from the wind when the system is positioned in a direction parallel to that of the wind.

Such constructive contrivance thus makes it possible to immobilize the rotation of the vanes 5 in order to carry out repairs or maintenance, but also in order to prevent, in the event of excessive winds, overloads on the electrical grid.

Conventional wind power systems, in order to meet a such requirement, must instead necessarily be provided with an adapted braking device.

The costs of such devices are high however and thus, in a multi-rotor wind power system, they can determine costs so high as to render their adoption prohibitive. Such problem has thus contributed to preventing the success of multi-rotor systems.

In the system 1, according to the disclosure, the presence therefore of the covering 22, which is connected to the upper part of the vanes 5, in fact defines the circular perimeter of the rotor 2, rendering the latter impervious to a wind that is parallel to its plane of rotation.

Such contrivance ensures that it is possible to immobilize the rotation of the vanes 5 of the rotor 2, and thus of the entire wind power system 1, simply by rotating the entire system 1 through 90°, so as to render it not perpendicular but parallel to the wind direction.

The film of the outer enclosure 8, the sheet of the vanes 5, the covering plate of the blades 10 and the covering 22 of the rotor 2 can be made of a material preferably selected from among polyamide, polycarbonate, polyethylene, methacrylate and the like.

The transparency of such components therefore reduces to the minimum the aesthetic and environmental impact of the system 1, thus making it in fact agri-compatible.

The tubular body 6 can comprise a plurality of tubular sections, preferably made of aluminum, with a rectangular cross-section, which are suspended in the central region of the structure 11, parallel to the wind direction but also to each other and arranged at a distance from each other that is equal to the diameter of the flange 19.

These tubular sections can then be joined by a plurality of circles, which are preferably made of aluminum and are covered externally by the film.

One of the end circles is arranged facing and proximate to the flange 19 of the rotor 2, the other acting as the base for the fairing 9.

Arranged on these five circles that make up the tubular body 6 are the strengthening ribs, preferably made of aluminum and of height equal to the diameter of the outer enclosure 8.

The ribs can form eight rows of five ribs each, such rows deviating gradually increasingly from the longitudinal axis of the tubular body 6, which supports them, until an inclination of 45° is reached with respect to such axis.

Furthermore, the ribs can provide support to the upper part of the blades 10, once assembly of the parts that make up the tubular body 6 is complete.

The tubular body 6 can thus be firmly connected to each tubular section.

The blades 10, according to a preferred solution, can be eight in number, each one connected, on one side, to the circles of the tubular body 6, and on the other side to the upper part of the ribs.

The blades 10 can be shaped so that in the section proximate to the area of entry of the wind they are arranged substantially parallel to the axis of the tubular body 6, in order to then deviate gradually from such axis, in the direction of rotation of the rotor 2, until they reach, proximate to the rotor 2, an inclination, again with respect to the axis of the tubular body 6, of approximately 45°, and thus of approximately 135° with respect to the plane of rotation of the rotor 2.

More specifically, the driven utility apparatus 3 can be of the type preferably selected from among an electricity generator, a compressor and the like.

Such generator can be controlled by an element that is preferably selected from among a mains electricity supply, a storage cell, an electrical load and the like.

Effectively, the system 1 is characterized by high yields.

In fact, the rotor 2 for the same diameter and shape of a conventional rotor 2 is capable of considerably increasing the specific yield of a rotor 2, with consequent decrease of the windspeed required to trigger the rotation and therefore increase of the overall operating time of the system 1.

Advantageously, the system 1, according to the disclosure, can operate with reduced windspeeds.

Conveniently, the system 1 can also be installed in areas with low levels of wind.

In fact, the rotation of the rotor 2 can be triggered even in the presence of weak winds, which have a reduced speed with respect to that necessary for conventional systems.

Conveniently, the wind power system 1 is of easy and economic maintenance.

Conveniently, the wind power system 1 has reduced periods of inactivity.

Positively, the wind power system 1 is agri-compatible.

In fact, the transparency of the outer enclosure 8, of the vanes 5, of the blades 10 and of the covering 22 therefore reduces to the minimum the aesthetic and environmental impact of the system 1, thus making it in fact agri-compatible.

In fact the substantial transparency of the various components of the system 1 makes it possible to not obstruct the photosynthesis of any cultivated land located in the vicinity of the system 1.

This enables the disclosure to take advantage, for its installation, of the vast surfaces currently used for agriculture.

The disclosure, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The invention claimed is:

1. A wind power system, comprising at least one rotor, which controls at least one respective driven utility apparatus, and at least one stator, wherein said at least one rotor is provided with a plurality of vanes that have a substantially flat profile, are arranged radially, and are inclined with respect to the rotation axis of the rotor by an angle comprised between 25° and 90°, and further comprise a reticular structure comprising a plurality of cables that connect an upper end of said reticular structure to a central body of said rotor, said stator, which is arranged upstream of said at least one rotor, being provided with a tubular body, which is coaxial to a shaft of said rotor and coaxial to a substantially cylindrical outer enclosure, said tubular body being provided with a tapered end fairing and with respective curved blades that are profiled to direct the air entering said stator toward the outer portion of said rotor onto said vanes, according to a preset angle of incidence that is adapted to maximize the yield of the wind power system, between the inner walls of said enclosure, two adjacent blades and said tubular body there being a forced path for the air entering said system, wherein said central body of said rotor comprises two flanges for supporting said vanes, said flanges having a different and smaller diameter than the diameter of said rotor, and being arranged in series and connected by rods that are arranged parallel to the shaft of said rotor.

2. The wind power system according to claim 1, further comprising a perimetric tubular structure provided with a plurality of tubular structure cables, within which said rotors, said stators and said driven utility apparatuses are kept in suspension.

3. The wind power system according to claim 2, further comprising a plurality of stays that connect a top of said tubular structure to the ground where said system is installed, which are adapted to stabilize the entire system and at the same time permit the rotation thereof about the axis of the tubular structure.

4. The wind power system according to claim 2, wherein said substantially cylindrical outer enclosure comprises two circular crowns, stably coupled to the tubular structure.

5. The wind power system according to claim 4, wherein said rotor comprises a substantially cylindrical outer covering supported by two end rings stably coupled to the tubular structure and wherein said covering is made of material selected from the group consisting of polyamide, polycarbonate, polyethylene, and methacrylate.

6. The wind power system according to claim 2, wherein said rotor comprises a substantially cylindrical outer covering supported by two end rings, which are stably coupled to the tubular structure.

7. The wind power system according to claim 1, wherein said at least one rotor and the respective stator are at least eight in number, four rotors and four stators, mutually aligned and arranged on at least two rows each of which comprises at least two rotors and two stators, so as to define a rhomboid tubular structure.

8. The wind power system according to claim 1, wherein said driven utility apparatus is of the type selected from an electricity generator and a compressor.

* * * * *